United States Patent
Côté et al.

(10) Patent No.: US 9,761,045 B1
(45) Date of Patent: Sep. 12, 2017

(54) DYNAMIC AND SELECTIVE MODEL CLIPPING FOR ENHANCED AUGMENTED HYPERMODEL VISUALIZATION

(71) Applicant: Bentley Systems, Incorporated, Exton, PA (US)

(72) Inventors: Stéphane Côté, Lac Beauport (CA); Robert Snyder, Lexington, MA (US); Renaud Gervais, Amos (CA)

(73) Assignee: Bentley Systems, Incorporated, Exton, PA (US)

( * ) Notice: Subject to any disclaimer, the term of this patent is extended or adjusted under 35 U.S.C. 154(b) by 274 days.

(21) Appl. No.: 13/945,552

(22) Filed: Jul. 18, 2013

Related U.S. Application Data

(63) Continuation-in-part of application No. 13/836,776, filed on Mar. 15, 2013, now Pat. No. 9,460,561.

(51) Int. Cl.
*G06T 15/30* (2011.01)
*G06T 17/10* (2006.01)

(52) U.S. Cl.
CPC .............. *G06T 17/10* (2013.01); *G06T 15/30* (2013.01)

(58) Field of Classification Search
None
See application file for complete search history.

(56) References Cited

U.S. PATENT DOCUMENTS

| 5,815,154 | A  | 9/1998 | Hirschtick et al. |
| 8,264,504 | B2 | 9/2012 | Naimark |
| 2003/0052877 | A1 | 3/2003 | Schwegle, Jr. et al. |
| 2003/0071810 | A1 | 4/2003 | Shoov et al. |
| 2007/0229542 | A1* | 10/2007 | van Ieperen ................. 345/638 |
| 2008/0218331 | A1 | 9/2008 | Baillot |
| 2009/0213116 | A1 | 8/2009 | Konev et al. |
| 2010/0188503 | A1* | 7/2010 | Tsai et al. ..................... 348/142 |
| 2011/0166831 | A1* | 7/2011 | Snyder et al. .................... 703/1 |
| 2011/0301919 | A2 | 12/2011 | Snyder et al. |

(Continued)

OTHER PUBLICATIONS

Bazargan, Kaveh, et al., "Specifying the Representation of Non-geometric Information in 3D Virtual Environments," Proceedings of the 13$^{th}$ International Conference on Human-Computer Interaction. Part II: Novel Interaction Methods and Techniques, Julie A. Jacko (ed.), Springer-Verlag, Berlin, Heidelberg, 2009, pp. 773-782.

(Continued)

*Primary Examiner* — Yi Wang
(74) *Attorney, Agent, or Firm* — Cesari and McKenna, LLP; James A. Blanchette

(57) ABSTRACT

In one embodiment, a three-dimensional (3-D) model is aligned with a view of a physical environment captured by a camera. An augmented reality view is generated by superposing elements of the 3-D model and the view of the physical environment. At least some of the elements of the 3-D model are initially hidden within the augmented reality view. A virtual window is imposed that penetrates a surface within the augmented reality view. The virtual window clips the view of the physical environment and elements of the 3-D model that intersect the virtual window to reveal initially-hidden elements of the 3-D model located beyond the virtual window. The augmented reality view with the virtual window is displayed on a display device.

20 Claims, 11 Drawing Sheets

(56) References Cited

U.S. PATENT DOCUMENTS

| | | | |
|---|---|---|---|
| 2012/0256946 A1* | 10/2012 | Nakamura | G06T 15/00 345/619 |
| 2012/0300984 A1 | 11/2012 | Dann et al. | |
| 2012/0314096 A1 | 12/2012 | Kruglick | |
| 2013/0002649 A1 | 1/2013 | Wu et al. | |
| 2013/0100118 A1* | 4/2013 | Mlyniec et al. | 345/419 |
| 2013/0226529 A1 | 8/2013 | Santiquet et al. | |
| 2014/0002491 A1 | 1/2014 | Lamb et al. | |
| 2014/0046627 A1* | 2/2014 | Pershing | 702/156 |
| 2014/0320484 A1 | 10/2014 | Rane | |

OTHER PUBLICATIONS

Boujut, Jean-Francois, et al., "Design of a 3D Annotation Tool for Supporting Evaluation Activities in Engineering Design," 2005, pp. 1-9.

Engelson, Vadim, et al., "Mechanical CAD with Multibody Dynamic Analysis Based on Modelica Simulation," Proceedings of the 44th Scandinavian Conference on Simulation and Modeling (SIMS'2003), 2003, pp. 1-6.

Foucault, Gilles, et al., "Enriching Assembly CAD Models with Functional and Mechanical Informations to Ease CAE," Proceedings of the ASME 2010 International Design Engineering Technical Conferences & Computers and Information in Engineering Conference IDETC/CIE 2010, Montreal, Canada, Aug. 15-18, 2010, pp. 1-11.

Gotzelmann, Timo, et al., "Annotation of Animated 3D Objects," 2007, pp. 1-14.

Polys, Nicholas Fearing, "Display Techniques in Information-Rich Virtual Environments," Dissertation Submitted to the Faculty of the Virginia Polytechnic Institute and State University, Blacksburg, Virginia, Jun. 2, 2002, pp. 1-172.

Ritter, Felix, et al., "Illustrative Shadows: Integrating 3D and 2D Information Displays," IUI' 03, ACM, Jan. 12-15, 2003, pp. 166-173.

Stein, Thierry, et al., "Dynamic Label Placement for Improved Interactive Exploration," Proceeding NPAR '08 Proceedings of the 6th international symposium on Non-photorealistic animation and rendering, ACM, 2008, pp. 15-21.

Cote, Stephane et al., "Technique for Providing an Initial Pose for a 3-D Model", U.S. Appl. No. 13/364,846, filed Feb. 2, 2012, 35 pages.

Pennetti, Cody, "The Flow of Information," POB: Point of Beginning, vol. 38, No. 4, <http:www.pobonline.com>, Jan. 2013, pp. 1-6.

Grossman, Tovi, et al., "Interaction Techniques for 3D Modeling on Large Displays," In Proceedings of the 2001 symposium on Interactive 3D graphics, ACM, Mar. 2001, pp. 17-23.

Schall, Gerhard, et al., "Virtual Redlining for Civil Engineering in Real Environments," IEEE Computer Society, Proceeding ISMAR '08 Proceedings of the 7th IEEE/ACM International Symposium on Mixed and Augmented Reality, Sep. 15-18, 2008, pp. 1-7.

* cited by examiner

DYNAMIC AND SELECTIVE MODEL CLIPPING FOR ENHANCED AUGMENTED HYPERMODEL VISUALIZATION

RELATED APPLICATIONS

The present application is a continuation-in-part of U.S. patent application Ser. No. 13/836,776 filed on Mar. 15, 2013 by Stéphane Côté et al., for "Hypermodel-Based Panorama Augmentation", the contents of which are incorporated by reference herein in their entirety.

BACKGROUND

Technical Field

The present disclosure relates to augmented reality, and more specifically, to techniques for displaying elements of a three-dimensional (3-D) model within an augmented reality view.

BACKGROUND INFORMATION

Design, construction and maintenance professionals often rely on two-dimensional (2-D) drawings that depict portions of structures (e.g., buildings). The 2-D drawings are directive statements that indicate tasks to be performed. For example, a directive statement may convey that someone should "look here (at this location), understand this and do this." Further, a directive statement may also validate something, for example convey that "this location (a physical location in a proposed project represented by this statement) is affirmed and validated, by a person who is authorized to affirm and validate such statements." The communicative effectiveness of these statements depends on their being understood in relation to the proper locations, and together with other statements. The user typically has to look at each of the 2-D drawings and attempt to create a mental model to determine the locations at issue and how the statements interrelate. This can be a daunting task which prevents effective communication. 2-D drawings are often misunderstood, causing delay, error, and waste.

Sometimes three-dimensional (3-D) models are used to produce 2-D drawings (while leaving them abstracted from the modeled environment), or for other purposes. A 3-D model is a virtual environment that represents some portion of the physical environment. Often, 3-D models lack the directive and affirmative qualities discussed above, and have typically exhibited a general problem of intelligibility. Among other things, it is often difficult to understand how a 3-D model relates to the physical environment. Since 3-D models are often of limited scope, and abstract many features, they may lack sufficient visual queues to facilitate rapid understanding. Likewise, when 3-D models have a greater scope and abstract fewer features, their complexity increases. As complexity increases intelligibility decreases and the need for clear directiveness and location-specific validation increases. In other words, the need to provide ways of looking at models that make them intelligible increases. As a result, 3-D models tend to be just as frustrating as 2-D drawings. Recently, certain efforts have been made to improve the intelligibility of 3-D models. For example, as described in U.S. patent application Ser. No. 12/652,411, filed Jan. 5, 2010 by Snyder et al., now issued as U.S. Pat. No. 9,384,308, entitled "Multi-Dimensional Artifact Assemblage for Infrastructure and Other Assets with Interface Node Mediators", information may be aligned and embedded within models that indicates specific "ways of looking" at them, to provide the directiveness and validation that makes them intelligible.

Other efforts have involved blending views of the physical environment captured by a camera with 3-D models, using augmented reality techniques. Augmented reality is a technology in which a view of the physical environment captured by a camera is augmented by computer-generated graphics, for example derived from a 3-D model. In contrast to virtual reality, where a simulated environment is shown to a user rather than a view of the physical environment, augmented reality blends the virtual with the real, to enhance a user's perception of the actual physical environment.

While these efforts show promise, there are still many challenges to be overcome. One challenge involves how to display internal or otherwise occluded portions of a structure. Users are typically not accustomed to viewing portions of a structure that are internal to, or behind other, opaque portions (e.g., components on the other side of a wall, or inside the wall itself). However, these portions may be of the most interest to a user. Attempts to show such portions often lead to unnatural and confusing displays that find no parallel in the physical world, and therefore are not easily understood by a user. Other challenges are presented when there is a need to switch among different views. Such switching is potentially disorientating to the user, who may not understand how the different views relate to each other. Simply jumping from one view to the next may confuse the user. In general, there is a need for improved techniques.

SUMMARY

In one embodiment, one or more augmented reality views are generated. To generate such views, one or more views of the physical environment (e.g., photographic panoramas) are obtained. Each view is captured from a position in physical space by a camera (i.e., a physical camera). A 3-D model is aligned with each of the views of the physical environment. Such alignment involves positioning a virtual camera within a model space of the 3-D model at a position that coincides with the position in physical space at which the camera captured the view of the physical environment. When the virtual camera is so positioned within the model space, elements of the 3-D model, as viewed by the virtual camera, correspond with portions of the physical environment, as viewed from the camera. An augmented reality view is produced in which elements of the 3-D model and the view of the physical environment are superposed. Each augmented reality view is associated with an augmentation point in the model space of the 3-D model, which coincides with the position of the virtual camera used with the augmented reality view.

When elements of a 3-D model and the view of the physical environment are superposed, the view of the physical environment may block at least some of the elements of the 3-D model, such that the elements are initially hidden in the augmented reality view. The initially-hidden elements of the 3-D model may represent internal or otherwise occluded portions of a structure (e.g., a building). To permit viewing of initially-hidden elements of the 3-D model in an augmented reality view, a virtual window may be imposed within the augmented reality view. The virtual window operates as a clipping box that penetrates a surface (e.g., a wall) depicted in the augmented reality view. Where the view of the physical environment intersects the virtual window, it is clipped away (e.g., removed). Further, where elements of the 3-D model, other than those on an exclusion list, intersect the virtual window, they are also clipped away (e.g., removed). Elements of the 3-D model on the exclusion list may be preserved. As a result of the clipping, initially-hidden elements of the 3-D model are revealed. The revealed elements may be located at or beyond the boundaries of the virtual window (e.g., deeper within the structure than the virtual window extends, or to the sides of the virtual window), and become visible now that the clipping has removed the portions that blocked their view. These revealed elements of the 3-D model are shown within the larger context of the view of the physical environment. Further, in the case of elements on the exclusion list, the elements may be located within the boundaries of the virtual window. These elements on the exclusion list are shown within the context of the reveled elements of the 3-D model at or beyond the boundaries of the virtual window, which are shown within the larger context of the view of the physical environment.

As discussed above, there may be multiple available views of the physical environment (e.g., photographic panoramas) captured from different positions in physical space, and thereby multiple augmented reality views may be generated. A user may desire to switch between the multiple available augmented reality views. A virtual mode may provide a visual transition when switching between views. In the virtual mode, a virtual view is shown that depicts elements of the 3-D model and the physical environment is hidden. The display of a virtual view while transitioning between augmented reality views associated with different augmentations points may help a user maintain their orientation. A virtual window may be provided in the virtual view. The virtual window may function similar to as in the augmented reality view, however, as any view of the physical environment is already hidden, only elements of 3-D model are clipped.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The detailed description below refers to the accompanying drawings of example embodiments, of which.

DETAILED DESCRIPTION

Figure 1:
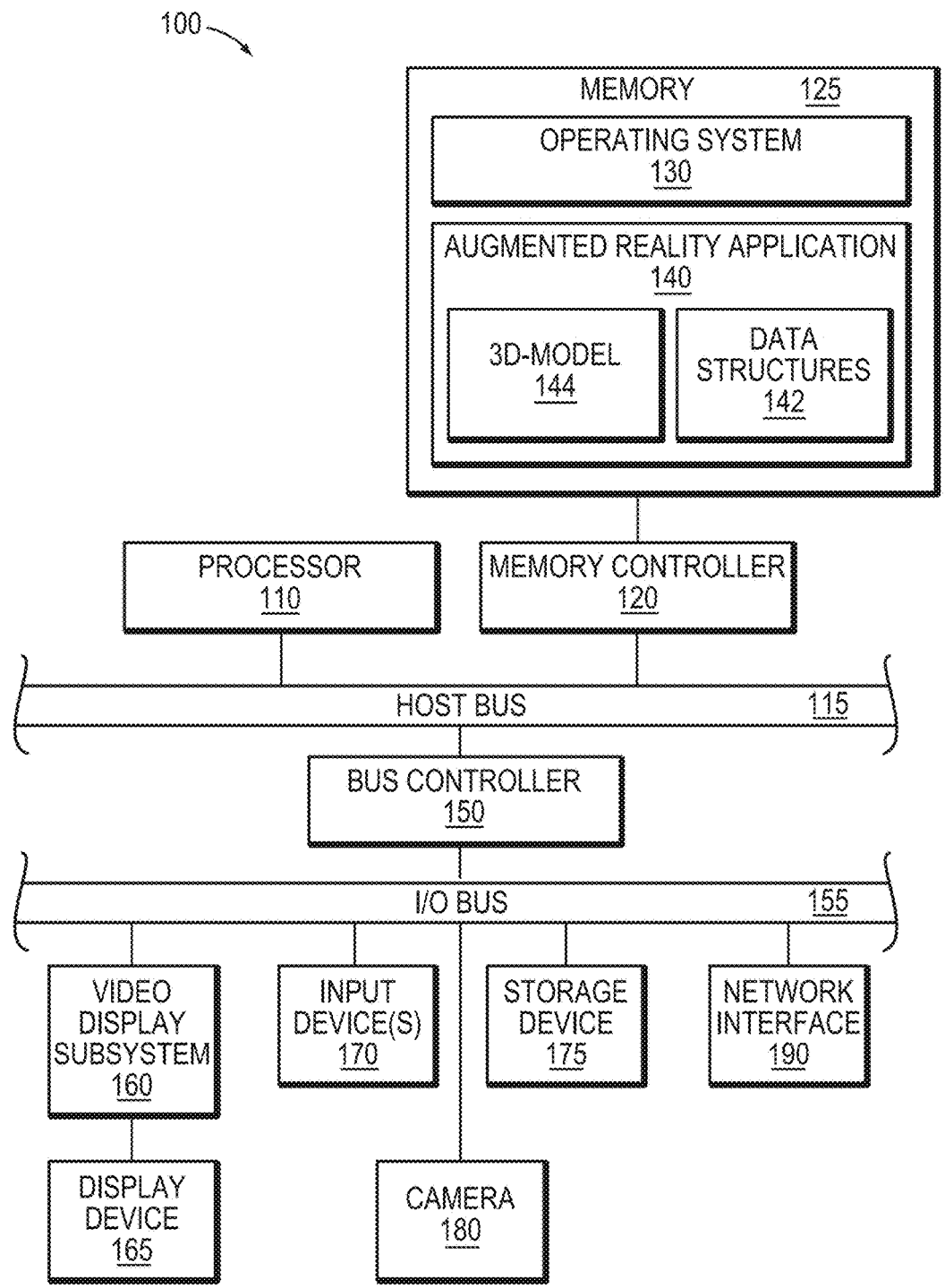
FIG. 1 is a block diagram of an example electronic device that may be used with the present techniques.

FIG. 1 is a block diagram of an example electronic device 100 that may be used with the present techniques. The electronic device 100 may be a portable electronic device (e.g., a notebook computer, a tablet computer, a Smartphone, etc.) or another type of electronic device. The electronic device 100 includes at least one processor 110 coupled to a host bus 115. The processor 110 may be any of a variety of commercially available processors, such as an Intel x86 processor, or another type of processor. A volatile memory 125, such as a Random Access Memory (RAM) or another type of volatile data store, is coupled to the processor 100, via a memory controller 120 and the host bus 115. When in operation, the memory 125 stores processor-executable instructions and data that are provided to the processor 110. An input/output (I/O) bus 155 is accessible to the host bust 120 via a bus controller 150.

A variety of additional components are coupled to the I/O bus 155. For example, a video display subsystem 160 is coupled to the I/O bus 155. The video display subsystem may include a display device 165 (e.g., a liquid crystal display (LCD) or other type of display screen) and hardware to drive the display device. At least one input device 170, such as a keyboard, a touch sensor, a touchpad, a mouse, etc., is also coupled to the I/O bus 155. A persistent storage device 175, such as a hard disk drive, a solid-state drive, or anther type of persistent data store, is further attached, and may persistently store computer-executable instructions and data, that are loaded into the volatile memory 125 when needed.

A camera 180 (i.e. a physical camera) is also coupled to the I/O bus 155. The camera 180 captures views of the physical environment, such as still images or videos. In one implementation, the camera 180 is a panoramic camera and the views of the physical environment take the form of photographic panoramas. Still further, a network interface 190 is coupled to the I/O bus 155. The network interface 190 enables communication over a computer network, such as the Internet, between the electronic device 100 and other devices (not shown), using any of a number of well known networking protocols. Such communication may enable collaborative, distributed, and remote computing, with functionality, including the functionality discussed herein, being spread across multiple, potentially remote, electronic devices.

Working together, the components of the electronic device 100 (and other electronic devices in the case of collaborative, distributed, and/or remote computing) may execute a number of different software applications. For example, in one embodiment, the memory 125 stores at least a portion of processor-executable instructions and data for an operating system (OS) 130 and an augmented reality application 140. Also, views of the physical environment (e.g. photographic panoramas) captured by the camera 180, at least temporarily, are stored in the memory 125 in data structures 142. Further, a 3-D model 144 that corresponds to the physical environment is also stored in the memory 125. The 3-D model 144 may be a vector based model, a point cloud, combinations thereof, or another type of virtual environment.

Figure 2:
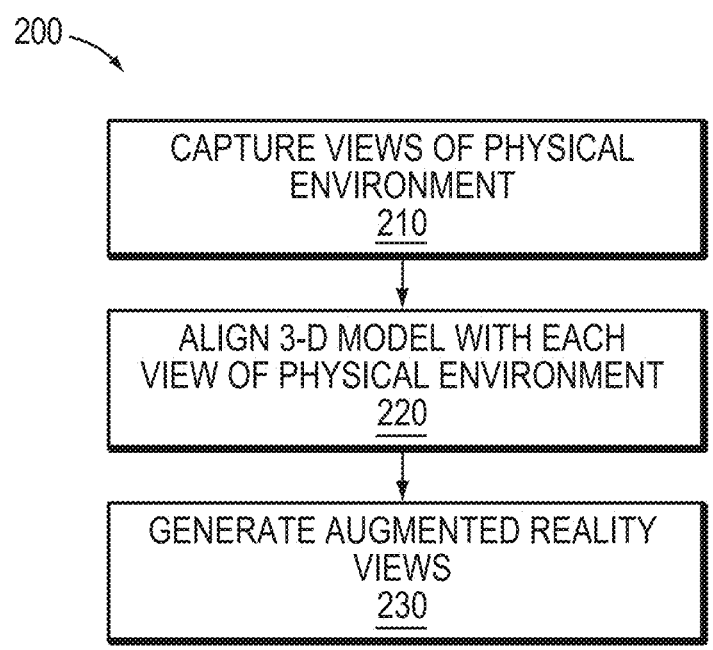
FIG. 2 is a generalized sequence of steps for generating an augmented reality view.

In one embodiment, the augmented reality application 140 generates augmented reality views that are displayed in a user interface shown on the display device 165. In is each augmented reality view, the 3-D model and a view of the physical environment captured by the camera are superposed. The superposing blends the virtual with the real, to enhance a user's perception of the physical environment. FIG. 2 is a generalized sequence of steps 200 for generating an augmented reality view. It should be understood that each step in the sequence 200 may include a number of sub-steps, or alternative steps, that are not shown. At step 210, one or more views of the physical environment (e.g., photographic panoramas) are captured. At step 220, the augmented reality application 140 aligns the 3-D model with each of the views of the physical environment. Such alignment involves positioning a virtual camera within a model space of the 3-D model at a pose (i.e. a position and an orientation) that coincides with a pose in physical space from which a camera 180 captured the view of the physical environment. When the virtual camera is so positioned within the model space of the 3-D model, elements of the 3-D model, as viewed by the virtual camera, correspond with portions of the physical environment, as viewed from the camera 180.

To determine the appropriate position of the virtual camera for each view of the physical environment, a "semi-manual" alignment procedure may be utilized. In one example "semi-manual" alignment procedure, the view of the physical environment and a depiction of the 3-D model are displayed to a user on a display device 165. Through an interactive process, the user roughly aligns the view of the physical environment and the depiction of the 3-D model, such that corresponding features in the two are proximate one another. The user then explicitly defines correspondence, by selecting corresponding features in the view of the physical environment and the 3-D model, to create a plurality of correspondence pairs. Using the correspondence pairs, a pose calculation algorithm of the augmented reality application 140 calculates a pose of the virtual camera that will align the 3-D model and the view of the physical environment. Alternatively, alignment may be performed using a fully "automatic" alignment procedure that does not involve user-designation of correspondence pairs.

After the 3-D model is aligned, at step 230, the augmented reality application 140 generates one or more augmented reality views. In each augmented reality view, elements of the 3-D model as viewed from the virtual camera are superposed on portions of is the physical environment. The physical environment may "block" at least some of the elements of the 3-D model or portions of at least some elements of the 3-D model, when the two are superposed. The blocking may cause the elements to be hidden in the augmented reality view created in step 230. For example, a portion of the view of the physical environment that represents a wall of a structure (e.g., a building) may block elements of the 3-D model that represent internal portions of the structure, such that they are hidden. A user who desires to understand the internal components of the structure may be unable, at least initially, to view elements of the 3-D model that represent the internal components, thereby being prevented from observing the elements they are primarily interested in.

Figure 3:
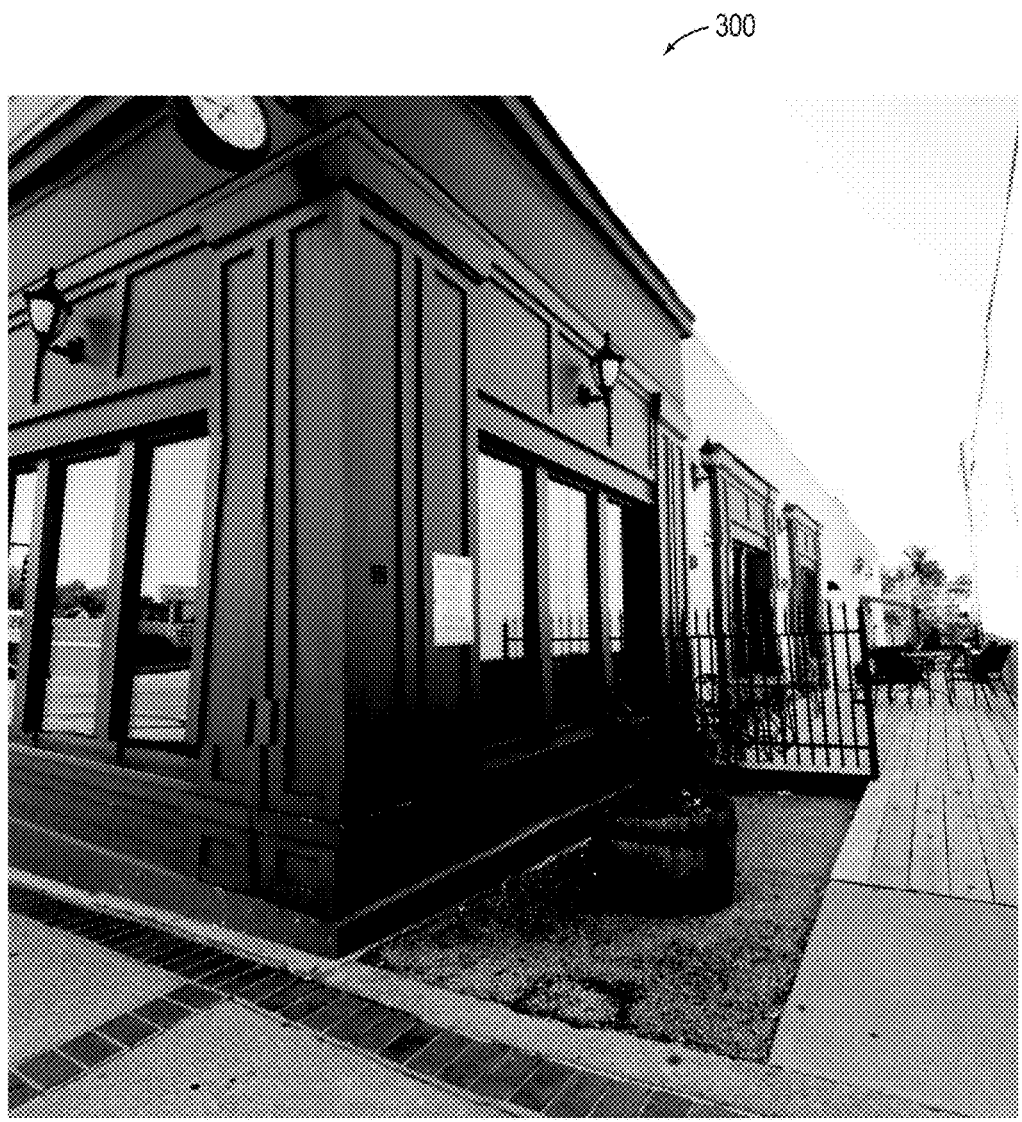
FIG. 3 is an example augmented reality view that may be initially displayed on a display device, showing a view of the physical environment blocking elements of a 3-D model.

FIG. 3 is an example augmented reality view 300 that may be initially displayed on the display device 165, showing a view of the physical environment blocking elements of the 3-D model. While elements may be present in the augmented reality view 300 that represent internal portions of the structure (e.g., building), they are completely hidden by the view of the physical environment, such that what is shown appears to be unaugmented.

To permit viewing of hidden elements of the 3-D model, a virtual window is imposed within an augmented reality view. A virtual window operates as a clipping box that penetrates a surface, for example, a wall of a structure such as a building, depicted in an augmented reality view. Where the view of the physical environment intersects the virtual window, it is clipped away (e.g., removed) by a clipping process of the augmented reality application 140. Further, certain elements of the 3-D model that intersect the virtual window are also clipped away (e.g., removed) by the clipping process of the augmented reality application 140. The selection of which intersecting elements are clipped may depend on an exclusion list. Elements of the 3-D model that are not on the exclusion list are clipped, while elements on the exclusion list are preserved, despite potential intersection with the virtual window.

Figure 4:
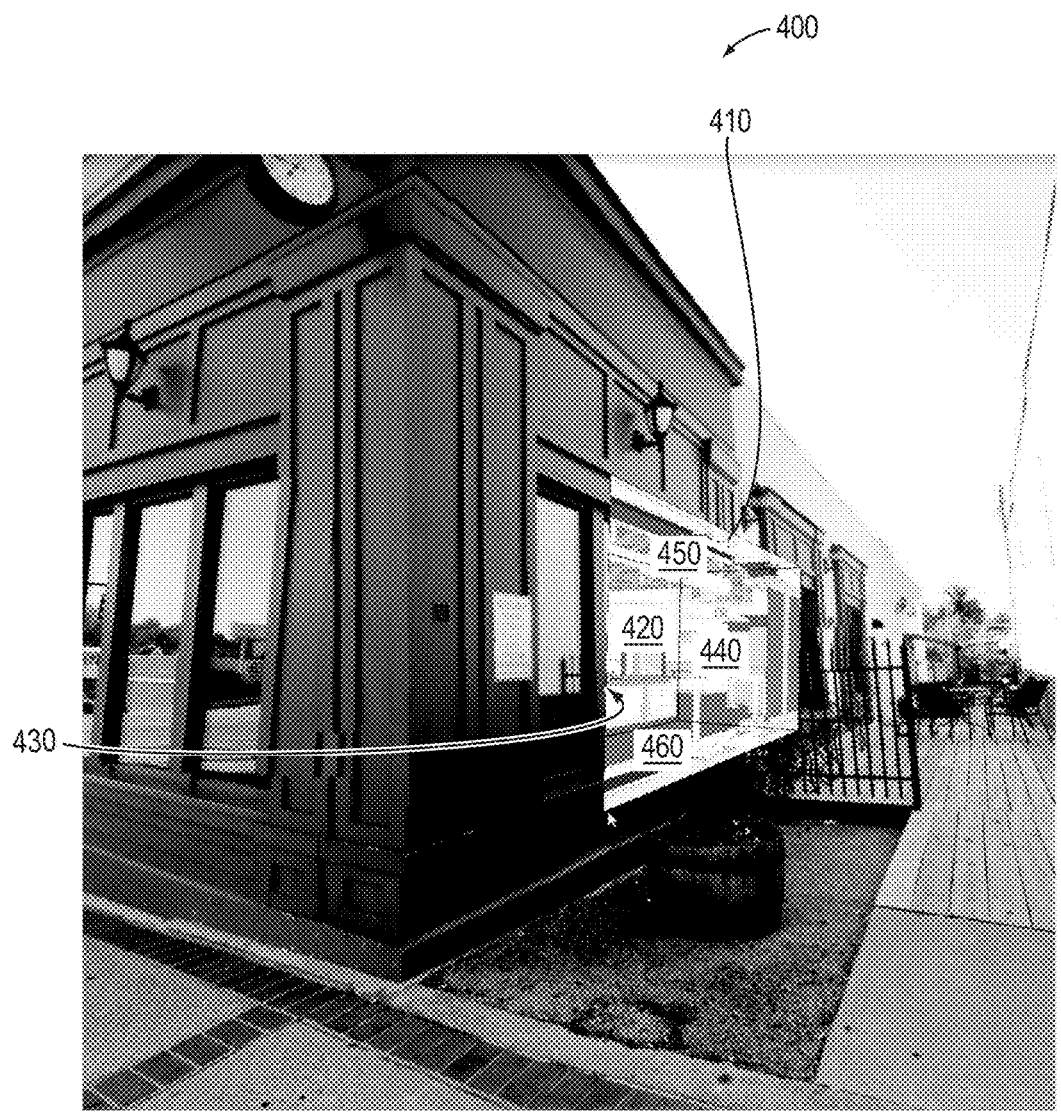
FIG. 4 is an example augmented reality view that includes a virtual window.

FIG. 4 is an example augmented reality view 400 that includes a virtual window 410. The virtual window 410 penetrates a surface (e.g., a wall), clipping both the view of the physical environment and elements of the 3-D model. The virtual window 410 has an is inner boundary surface 420 that defines the depth it penetrates into the surface, side boundary surfaces 430, 440 that define a width it extends in the surface, and top and bottom boundary surfaces 450, 460 that define a height it extends in the surface. The view of the physical environment and elements of the 3-D model are clipped along these boundary surfaces, such that anything within the space they enclose (that is not included on the exclusion list) is removed, while anything to the exterior of this space is preserved. As a result of the clipping, elements of the 3-D model located at or beyond the boundary surfaces 420-460 are revealed in the augmented reality view. It should be understood that a boundary surface 420-460 may slice through elements that extend through the surface, such that they are partially clipped. The revealed portions of 3-D model are shown within the context of the view of the physical environment (that is shown outside of the virtual window 410), which provides an environment for understanding them.

Figure 5:
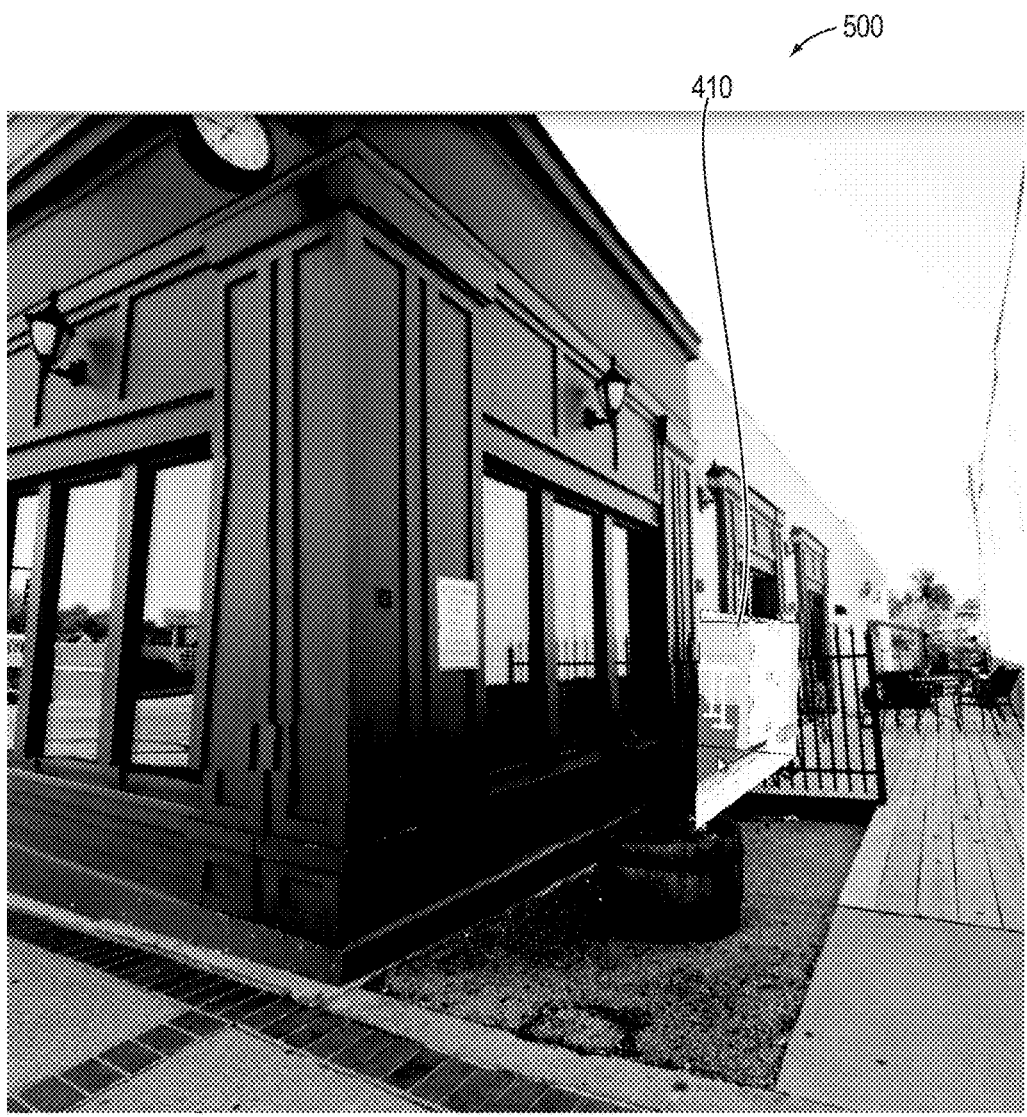
FIG. 5 is an updated example augmented reality view, illustrating the virtual window moved laterally down the wall of the structure.

In response to user input on an input device 170, the augmented reality application 140 may move and/or resize the virtual window 410. For example, in response to a user selecting the entire virtual window 410 and "dragging" the virtual window along the surface to another position, using an input device 170, the augmented reality application 140 moves the virtual window 410 to the other position. Alternatively, the virtual window may be moved in response to other user-input. FIG. 5 is an updated example augmented reality view 500, illustrating the virtual window 410 moved laterally down the wall of the structure.

Figure 6:
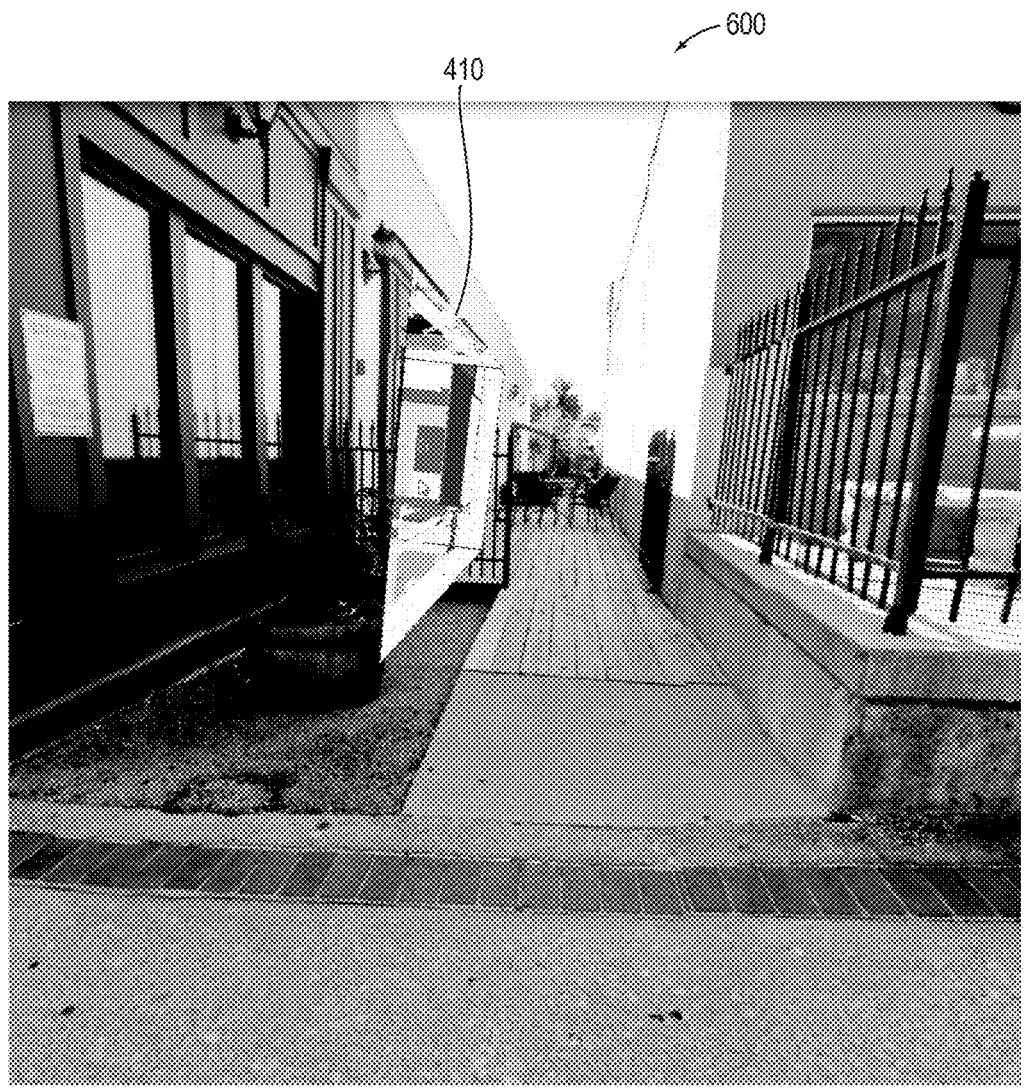
FIG. 6 is an updated augmented reality view, illustrating the virtual window resized to be larger.

Further, in response to a user selecting a particular boundary surface and "dragging" the boundary surface to a different position, using in input device 170, the augmented reality application 140 resizes the virtual window 410 by moving the particular boundary surface, or some subset of boundary surfaces. Alternatively, the virtual window may be resized in response to other user-input. FIG. 6 is an updated augmented reality view 600, illustrating the virtual window 410 resized to be larger. The entire augmented reality view is also zoomed in.

Figure 7:
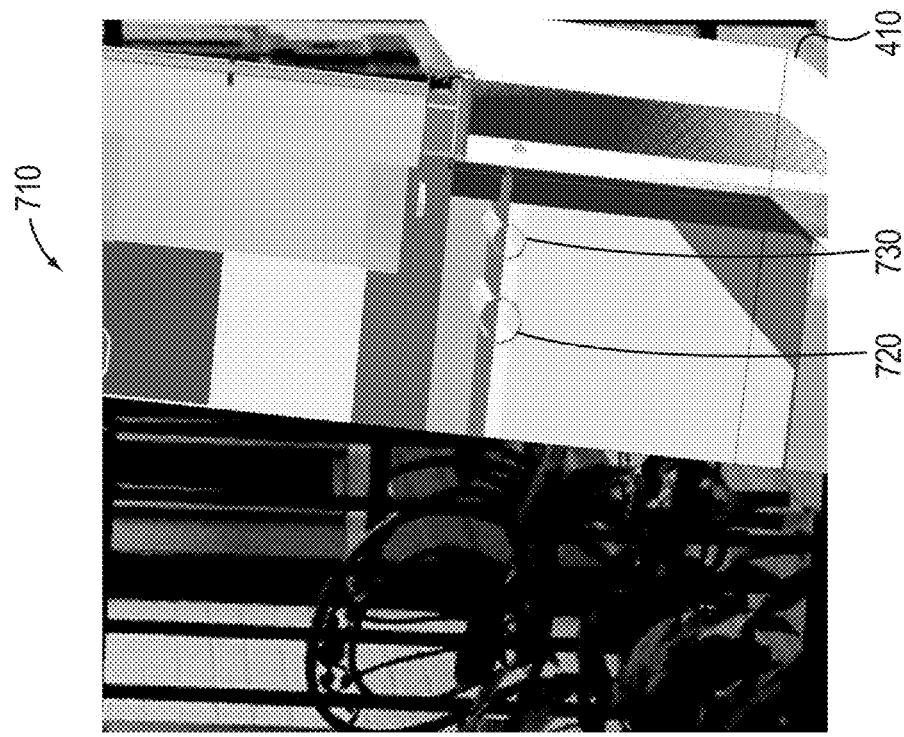
FIG. 7 is a comparison of two enlargements of a portion of an augmented reality view, depicting effects of adding elements to an exclusion list.
Figure 7:
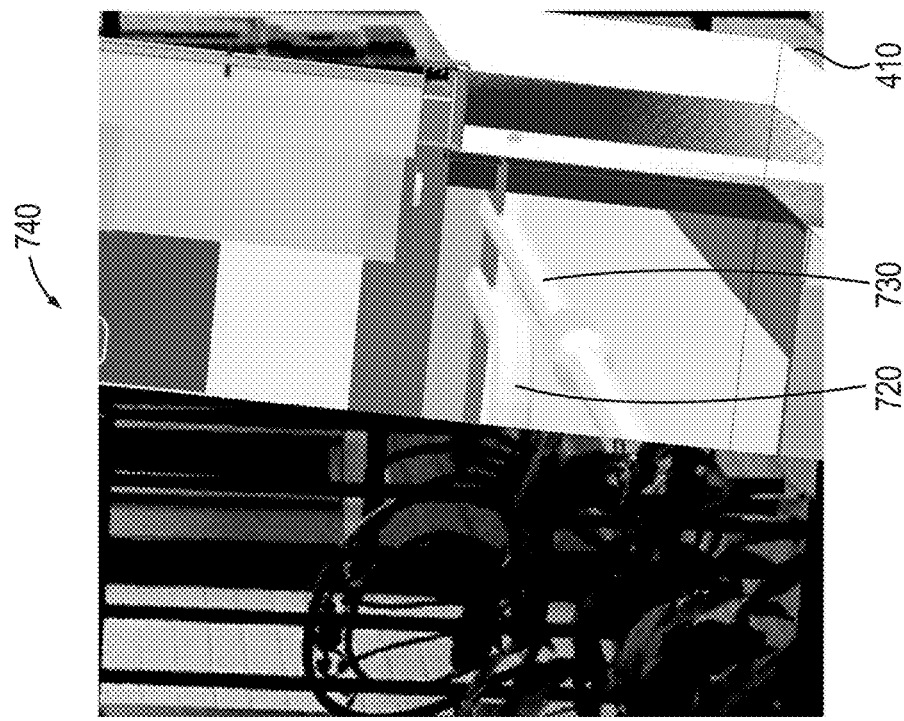

The exclusion list is user-configurable, for example, using the input device 170. As discussed above, elements on the exclusion list are maintained in the augmented reality view, even when they intersect the virtual window. FIG. 7 is a comparison of two enlargements 710, 740 of a portion of an augmented reality view, depicting effects of adding elements to the exclusion list. In the first enlargement 710, a first element 720 (e.g., a first pipe) and a second element 730 (e.g., a second pipe) are not on the exclusion list, and are clipped where they intersect the virtual window 410. In the second enlargement 740, the first element 720 (e.g., the first pipe) and the second element 730 (e.g., the second pipe) have been added to the exclusion list, and are displayed within the virtual window 410. In effect, the first and second elements 720, 730 are displayed within the context of the reveled elements of the 3-D model located at or beyond the boundaries of the virtual window 410, which is in turn displayed within the larger context of the view of the physical environment. Such a display may allow a user to understand the relationship of the exclusion list elements to their surroundings.

Figure 8:
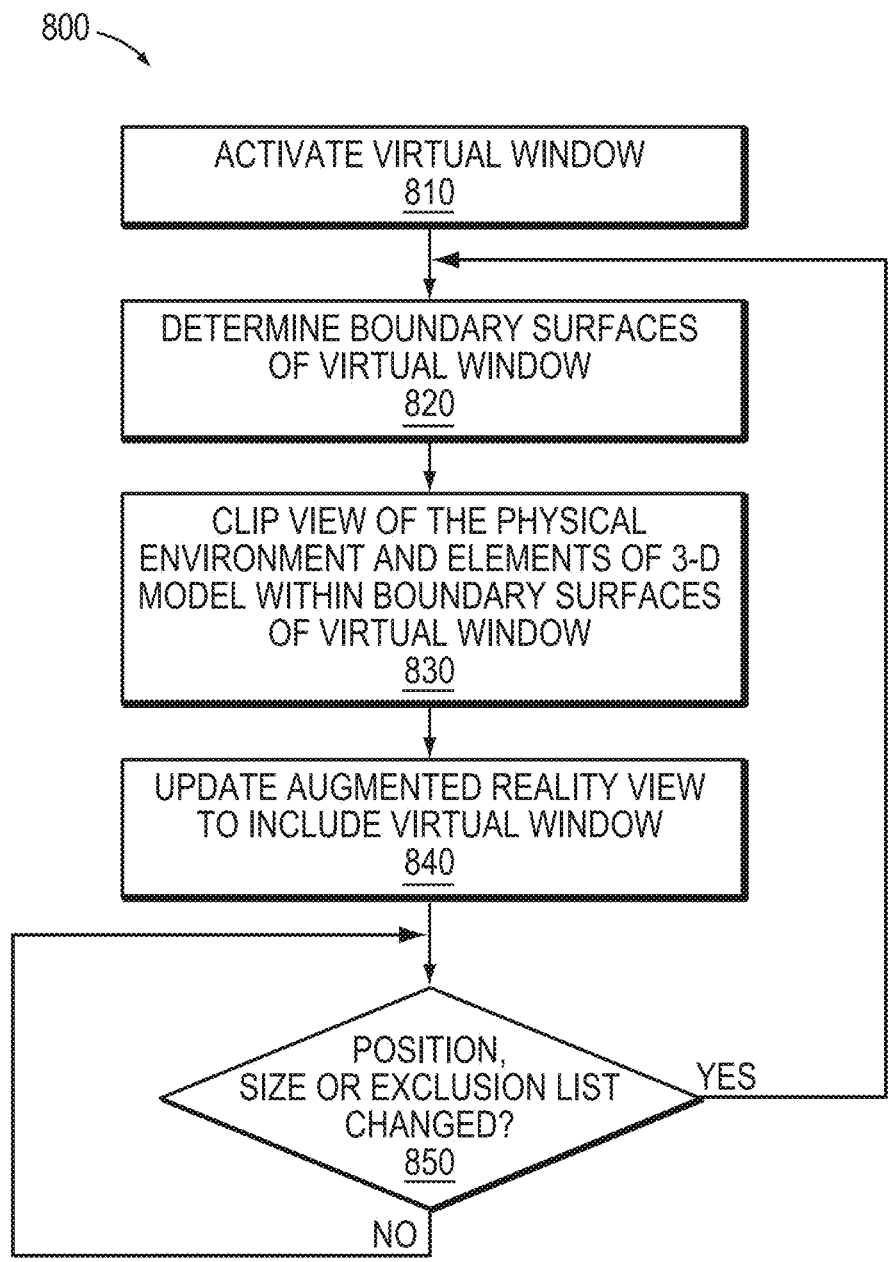
FIG. 8 is a flow diagram of an example sequence of steps for imposing a virtual window within an augmented reality view.

FIG. 8 is a flow diagram of an example sequence of steps 800 for imposing a virtual window within an augmented reality view. It should be understood that each step in the sequence 800 may include a number of sub-steps, or alternative steps, that are not shown. At step 810, a virtual window is activated, for example, in response to user input on an input device 170. The virtual window has an initial position and size that may be provided by the user, or provided as a default. The virtual window is also associated with an initial exclusion list, which may be configured in response to input provided by the user, or in response to default settings. The initial exclusion list may include no elements (i.e. be empty). At step 820, the virtual reality application 140 determines the boundary surfaces of the virtual window, based on the virtual window's current position and size. At step 830, the virtual reality application 140 clips (e.g., removes) the view of the physical environment and elements of the 3-D model that intersect the virtual window. Specifically, a portion of the view of the physical environment that falls within the boundary surfaces is removed, and any elements or portions of elements of the 3-D model that are not on the exclusion list and that fall within the boundary surfaces are removed. Elements of the 3-D model on the exclusion list are preserved. At step 840, the virtual reality application 140 updates the augmented reality view shown on the display device 165 to include the virtual window with the related clipping. At step 850, a determination is made whether the position, size, or exclusion list of the virtual window is to be changed, for example, in response to user input on an input device 170. If so, execution loops back to step 820, and the augmented reality view being shown is updated to show the virtual window with the changed position or size, or to reflect the changed exclusion list. If not, the current virtual window continues to be shown, with execution looping back to step 840.

As discussed above, there may be multiple available views of the physical environment (e.g., photographic panoramas) captured from different positions in physical space, and thereby multiple augmented reality views may be generated by placing a virtual camera at different positions in model space and superposing the 3-D model as seen from these perspectives on the views of the physical environment. A user may desire to switch between the multiple available augmented reality views. The positions in model space where the virtual camera is placed for an augmented reality view may be considered augmentation points, and thereby each available augmented reality view may be associated with a corresponding augmentation point. Switching between augmented reality views may involve switching between different augmentation points. The augmented reality application 140 supports a virtual mode that may provide a visual transition between augmented reality views associated with different augmentation points. Further, the virtual mode may also be utilized for other purposes, unrelated to transitions between augmented reality views. The virtual mode provides a virtual view in which elements of the 3-D model are shown, but no views of the physical environment are provided.

Figure 9:
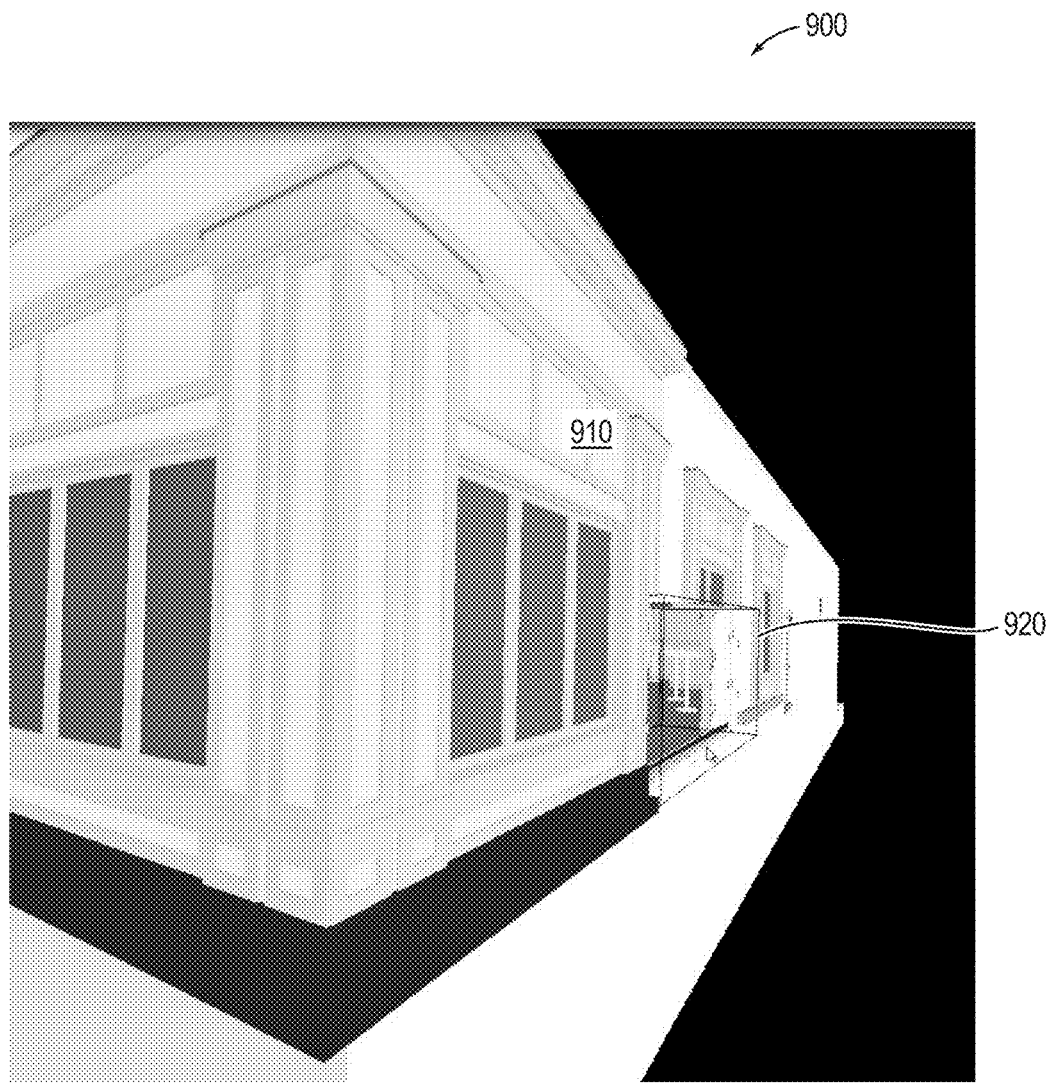
FIG. 9 is an example virtual view that may be displayed on a display device.

When an augmentation point is selected (e.g., the virtual camera is at the augmentation point), the augmented reality application 140 may toggle between displaying an augmented reality view and displaying a virtual view, on the display device 165. FIG. 9 is an example virtual view 900 that may be displayed on the display device 165. In the virtual view, elements of the 3-D model 910 are shown from the perspective of the virtual camera. A virtual window 920 may be provided in the virtual view 900. The virtual window 920 may function similar to a virtual window 410 in an augmented reality view, however, as there is no view of the physical environment present, only the elements of 3-D model are clipped.

Figure 10:
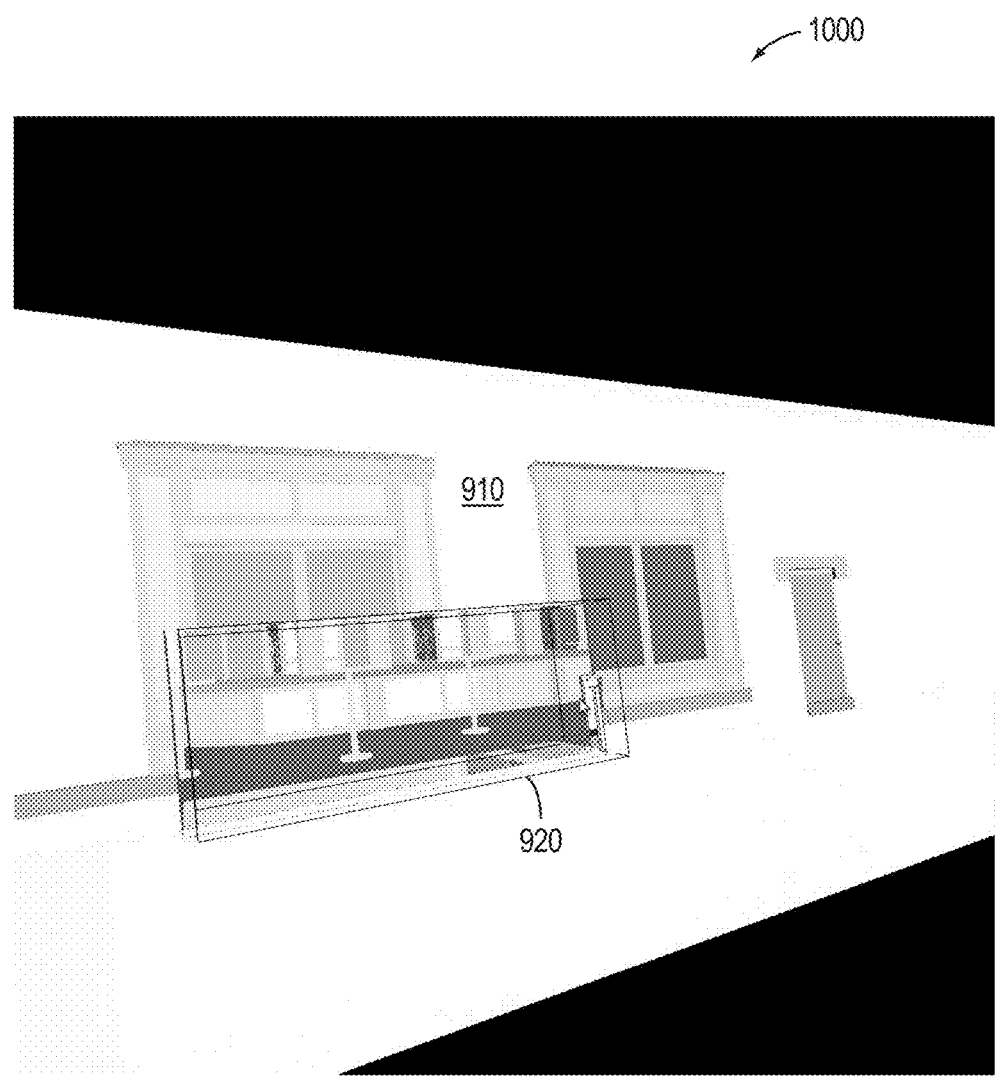
FIG. 10 is an example virtual view that may be displayed on a display device, depicting a virtual camera moved to a different position in a model space of a 3-D model.

After entering the virtual mode, the virtual camera may be moved about the model space of the 3-D model. FIG. 10 is an example virtual view 1000 that may be displayed is on the display device 165, depicting the virtual camera moved to a different position in model space of the 3-D model. The elements of the 3-D model 910, and the virtual window 920, are shown from a different perspective coinciding with the different position of the virtual camera.

Figure 11:
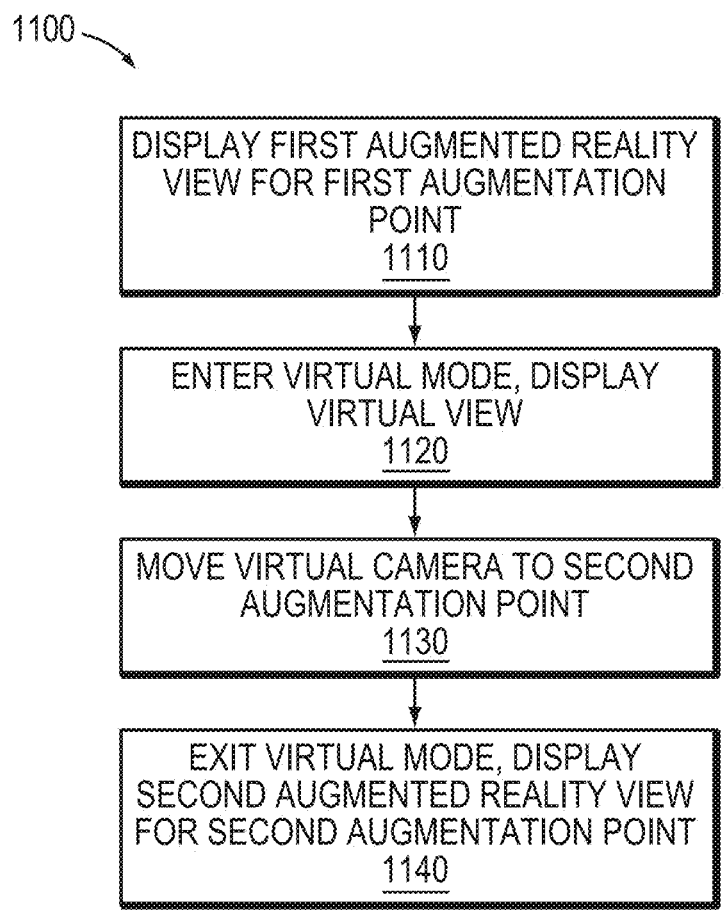
FIG. 11 is an example sequence of steps for transitioning between a first augmented reality view associated with a first augmentation point and a second augmented reality view associated with a second augmentation.

A virtual view may be used to transition between one augmented reality view associated with one augmentation point and another augmented reality view associated with another augmentation point. FIG. 11 is an example sequence of steps 1100 for transitioning between a first augmented reality view associated with a first augmentation point and a second augmented reality view associated with a second augmentation. At step 1110, the augmented reality application 140 displays a first augmented reality view associated with the first augmentation point on the display device 165. At step 1120, a virtual mode is entered, and the augmented reality application 140 displays a virtual view on the display device 165. In the virtual view, only the 3-D model is visible. At step 1130, the virtual camera is moved to the second augmentation point. While the virtual camera is moved, the 3-D model is shown from different perspectives, such that the user may understand the spatial relationship between the two augmentation points. At step 1140, the virtual mode is exited at the second augmentation point, and the augmented reality application 140 displays the second augmented reality view on the display device 165. The entire sequence of steps 1100 may be performed in an automated manner, such that the transition between augmentation points using the virtual mode is show to the user, yet the user does not have to manually move the virtual camera. Alternatively, the sequence may be performed manually, with the user manually moving the virtual camera.

It should be understood that the virtual mode is not limited to providing a transition between augmented reality views. In some embodiments, a user may enter the virtual mode to freely explore the 3-D model, with the virtual camera being moved among positions for which no augmented reality views are available. In such free exploration, virtual windows may be shown or hidden, in response to user input.

While the above description discusses various embodiments of the present disclosure, it should be apparent that a number of modifications and/or additions may be made without departing from the disclosure's intended spirit and scope.

While it is discussed above that the augmented reality application 140, the camera 180, and the display device 165 may all be resident on the same electronic device 100, it should be understood these components may be distributed among two or more electronic devices. For example, a mobile device may incorporate the camera 180 and be used for image collection, while a remote server may host the augmented reality application 140. A separate desktop computer may include the display device 160, and be used to show augmented reality views to the user. A variety of other configurations, involving multiple interoperating electronic devices, may alternatively be employed.

Further, while a building is discussed above as an example of a structure having a surface that a virtual window may penetrate, it should be understood that a structure may take any of a variety of other forms. For example, a structure may be a civil engineering work such as a bridge or dam, a mechanical apparatus such as vehicle or piece of machinery, or another real-world object constructed from one or more parts. Further, while it is discussed above that the surface penetrated by the virtual window may be a wall, it should be understood that surface need not be a substantially-flat vertical surface, and may take the form of a horizontal surface (such as a floor or ceiling), an angled surface, a contoured surface, or some other type of surface.

Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method comprising:
    aligning a three-dimensional (3-D) model with a view of a physical environment captured by a camera;
    generating an augmented reality view by superposing elements of the 3-D model and the view of the physical environment, at least some of the elements of the 3-D model being initially hidden behind the view of the physical environment within the augmented reality view;
    configuring an exclusion list for elements of the 3-D model;
    imposing a virtual window that penetrates a wall of a structure within the augmented reality view, the virtual window clipping the view of the physical environment and elements of the 3-D model that are not on the exclusion list that intersect the virtual window, while preserving any elements of the 3-D model that are on the exclusion list that intersect the virtual window, to produce a display that shows initially-hidden excluded elements of the 3-D model located within the virtual window in the context of initially-hidden elements of the 3-D model located beyond the virtual window, in the larger context of the view of the physical environment; and
    displaying the augmented reality view with the virtual window on a display device.

2. The method of claim 1, wherein the imposing further comprises:
    determining boundary surfaces of the virtual window;
    removing a portion of the view of the physical environment that falls within the boundary surfaces; and
    removing elements or portions of elements of the 3-D model that are not on the exclusion list that fall within the boundary surfaces.

3. The method of claim 1, wherein the imposing further comprises:
    determining a position or size of the virtual window has been changed; and
    updating the augmented reality view to show the virtual window with the changed position or size.

4. The method of claim 1, wherein the exclusion list is configured in response to user input.

5. The method of claim 1, wherein the imposing further comprises:
    determining the exclusion list has been changed; and
    updating the augmented reality view to show the virtual window with the changed exclusion list.

6. The method of claim 1, wherein the aligning aligns the 3-D model with a first view of the physical environment and a second view of the physical environment, the generating generates a first augmented reality view and a second augmented reality view by superposing elements of the 3-D model and the first view of the physical environment and the second view of the physical environment, respectively, wherein the first augmented reality view is associated with a first augmentation point in a model space of the 3-D model, and the second augmented reality view is associated with a second augmentation point in the model space of the 3-D model.

7. The method of claim 6, further comprising:
    transitioning between the first augmented reality view and the second augmented reality view by entering a virtual mode in which a virtual view that includes only the 3-D model is displayed on the display device.

8. The method of claim 7, further comprising:
    moving a virtual camera within a model space of the 3-D model to show the 3-D model from one or more different perspectives while in the virtual view.

9. The method of claim 7, further comprising:
    maintaining the virtual window in the virtual view, the virtual window in the virtual view clipping elements of the 3-D model that intersect the virtual window.

10. The method of claim 1, wherein the structure is a building, and the virtual window reveals elements of the 3-D model that correspond to internal portions of the building.

11. The method of claim 1, wherein the virtual window extends to an inner boundary surface that defines a depth it penetrates into the surface, and is defined by side boundary surfaces that define a width it extends in the surface, and top and bottom boundary surfaces that define a height it extends in the surface.

12. An electronic device comprising:
    a display device;
    a processor; and
    a memory coupled to the processor and configured to store instructions for an augmented reality application that is executable on the processor, the instructions for the augmented reality application, when executed, operable to:
  generate an augmented reality view by superposing elements of a three dimensional (3-D) model and a view of the physical environment captured by a camera, at least some of the elements of the 3-D model being initially hidden behind the view of the physical environment within the augmented reality view,
  impose a virtual window within the augmented reality view that penetrates a wall of a structure within the augmented reality view, the virtual window clipping the view of the physical environment and elements of the 3-D model that are not on an exclusion list that intersect the virtual window, while preserving any elements of the 3-D model that are on the exclusion list that intersect the virtual window, to produce a display that shows initially-hidden excluded elements of the 3-D model located within the virtual window in the context of initially-hidden elements of the 3-D model located beyond the virtual window, in the larger context of the view of the physical environment; and
  display the augmented reality view with the virtual window on the display device.

13. The electronic device of claim 12, wherein the instructions that, when executed, are operable to impose are further operable to:
  determine boundary surfaces of the virtual window;
  remove a portion of the view of the physical environment that falls within the boundary surfaces; and
  remove elements or portions of elements of the 3-D model that are not on the exclusion list that fall within the boundary surfaces.

14. The electronic device of claim 12, wherein the instructions that, when executed, are operable to impose are further operable to:
  determine a position or size of the virtual window has been changed; and
  update the augmented reality view to show the virtual window with the changed position or size.

15. The electronic device of claim 12, wherein the instructions that, when executed, are operable to impose are further operable to:
  determine the exclusion list has been changed; and
  update the augmented reality view to show the virtual window with the changed exclusion list.

16. A non-transitory computer-readable medium containing executable instructions, the executable instructions, when executed by one or more processors, operable to:
  align a three-dimensional (3-D) model with a first view of a physical environment captured by a camera and a second view of the physical environment captured by the camera;
  generate a first augmented reality view and a second augmented reality view by superposing elements of the 3-D model and the first view of the physical environment and the second view of the physical environment;
  associate the first augmented reality view with a first augmentation point in a model space of the 3-D model, and the second augmented reality view with a second augmentation point in the model space of the 3-D model;
  display the first augmented reality view; and
  transition between the first augmented reality view and the second augmented reality view by
    entering a virtual mode in which a virtual view that includes only the 3-D model is displayed,
    showing the virtual view that includes only the 3-D model while a virtual camera is moved within the model space of the 3-D model between the first augmentation point and the second augmentation point, and
    upon reaching the second augmentation point, exiting the virtual mode to display the second augmented reality view.

17. The non-transitory computer-readable medium of claim 16 wherein the executable instructions, when executed by one or more processors, are further operable to:
  impose a virtual window that penetrates a wall of a structure within the virtual view, the virtual window in the virtual view clipping elements of the 3-D model that intersect the virtual window.

18. The non-transitory computer-readable medium of claim 16, wherein the entering, showing and exiting of the transition are performed automatically absent manual movement of the virtual camera by a user.

19. A method comprising:
  aligning a three-dimensional (3-D) model with a first view of a physical environment captured by a camera and a second view of the physical environment captured by the camera;
  generating a first augmented reality view by combining elements of the 3-D model as viewed from a first position in model space of the 3-D model with the first view, and a second augmented reality view by combining elements of the 3-D model as viewed from a second position in model space of the 3-D model with the second view;
  displaying the first augmented reality view on a display device; and
  transitioning between the first augmented reality view and the second augmented reality view by
    entering a virtual mode in which a virtual view that includes only the 3-D model is displayed,
    showing the virtual view that includes only the 3-D model while a virtual camera is moved within the model space of the 3-D model between the first position and the second position, and
    upon reaching the second position, exiting the virtual mode to display the second augmented reality view.

20. The method of claim 19, further comprising:
  impose a virtual window that penetrates a wall of a structure within the virtual view, the virtual window in the virtual view clipping elements of the 3-D model that intersect the virtual window.

* * * * *

UNITED STATES PATENT AND TRADEMARK OFFICE
CERTIFICATE OF CORRECTION

PATENT NO. : 9,761,045 B1
APPLICATION NO. : 13/945552
DATED : September 12, 2017
INVENTOR(S) : Stéphane Côté et al.

Page 1 of 1

It is certified that error appears in the above-identified patent and that said Letters Patent is hereby corrected as shown below:

In the Specification

Column 5, Line 7 reads:
a user interface shown on the display device 165. In is each
Should read:
a user interface shown on the display device 165. In each Signed and Sealed this
Eleventh Day of September, 2018

Andrei Iancu
*Director of the United States Patent and Trademark Office*